United States Patent Office 3,251,880
Patented May 17, 1966

3,251,880
PURIFICATION OF p,p'-OXYDIANILINE
Willard M. Gentry, Midland, Mich., assignor to The Dow Chemical Company, Midland, Mich., a corporation of Delaware
No Drawing. Filed May 7, 1964, Ser. No. 365,799
7 Claims. (Cl. 260—571)

The present invention relates to an improved method for purifying p,p'-oxydianiline, sometimes named as p,p'-diaminodiphenyl ether.

This compound is useful as a chemical intermediate and it is particularly useful as a difunctional starting material for the preparation of polymers of various types. For such uses, it is desirable to have this compound available in high purity, free of isomers and reactive by-products.

p,p'-Oxydianiline can be prepared in a number of ways, two of the more common methods being the reduction of bis(p-nitrophenyl) ether and the ammonolysis of the corresponding dichloro or dibromo diphenyl ether. In such preparations, because of impurities in the starting material or side reactions which occur during the process, there are produced various undesirable by-products including both monofunctional and difunctional compounds such as phenoxyaniline, halo or nitrophenoxyaniline, aminophenoxyphenol, and the like. Position isomers of oxydianiline may also be present in the product. The preparation of pure p,p'-oxydianiline is also often complicated by the presence in the crude product of highly colored contaminants such as iron compounds or materials formed by decomposition or oxidation of amino groups.

Methods are known whereby such colored impurities can be removed from a product. For example, most or all of the tarry decomposition products can be separated by treating a solution of the impure product with activated carbon. Iron compounds are advantageously reduced to the ferrous state and thereby maintained in solution while the oxydianiline is precipitated or crystallized and separated by filtration. Such reduction also is effective in reducing some of the colored organic impurities. Compounds such as sodium dithionite, sodium bisulfite, and sodium formaldehyde sulfoxylate are effective reducing agents for this purpose.

It is also known that some by-products, particularly compounds of lower functionality than the desired product, are effectively removed by extracting an aqueous solution of a strong mineral acid salt of p,p'-oxydianiline with a water-immiscible solvent such as an aliphatic ketone of five to eight carbon atoms, a polychlorinated lower aliphatic hydrocarbon, or an aromatic hydrocarbon of the benzene series. This extraction procedure is also effective to some extent in removing difunctional impurities from the product. However, complete removal of these materials from p,p'-oxydianiline is not possible by this method.

It has now been found that difunctional impurities such as position isomers and aminophenoxyphenol are effectively removed and a highly purified grade of product is obtained by the precipitation of p,p'-oxydianiline in an aqueous lower alkanol medium by the reaction of its strong mineral acid salt with a base. This precipitation is accomplished by forming a homogeneous aqueous solution of the salt, adding to the solution about 0.4–6 parts of alkanol per part of water in the solution to provide a final solvent medium consisting essentially of about 30–85% by weight of alkanol, the remainder being water, and sufficient of a suitable base to obtain a pH above about 5, thereby causing precipitation of the free amine as the base is added until the major part of the amine has been precipitated.

Any of the water-miscible lower alkanols, i.e., those which are soluble in water in all proportions at room temperature, can be used as the alcohol component. Ethyl or isopropyl alcohol is preferred. Best results are usually obtained when the aqueous alkanol medium contains about 40–60% of alkanol, i.e., about 0.7–1.5 parts of alcohol per part of water. Mixtures of these alkanols can be employed.

Salts of p,p'-oxydianiline which are operable in the process are the salts with strong mineral acids such as sulfuric acid, hydrochloric acid, and hydrobromic acid. The hydrochloride is preferred. For effective operation of the process, it is necessary that the acid salt be completely dissolved prior to precipitation by addition of the base.

Bases suitable for the precipitation step are those capable of liberating the free amine from its acid salt. These bases include ammonium hydroxide, alkali metal hydroxides and carbonates, and alkaline earth metal hydroxides. Preferably, an alkali metal hydroxide such as sodium or potassium hydroxide is the base. While addition of sufficient base to the salt solution to obtain a mixture having a pH in excess of 5 will yield good results, the purification process is most efficient when the neutralization is continued to a final pH in excess of about 9.

The precipitation can be carried out at any temperature where the reaction medium is liquid, i.e., between its freezing and boiling points. Preferably, the base is added to the acidic salt solution at about 50–80° C. and the neutralized slurry is then cooled below about 30° C. to obtain as complete a separation as possible of solid p,p'-oxydianiline from the aqueous alkanol.

The proportion of aqueous alkanol to oxydianiline salt is not a critical factor in the process so long as there is initially present sufficient water to dissolve the salt completely. Where higher concentrations of alcohol are employed, it is particularly desirable to hold the total volume of solvent to a minimum to ensure precipitation rather than solution of the liberated amine upon addition of base and also to obtain good product recovery.

The process can be operated in a number of ways within the general description above. For example, the impure oxydianiline can be dissolved in aqueous mineral acid and then precipitated by addition of an alcoholic base solution. Alternatively, the oxydianiline salt may be dissolved in aqueous alkanol and precipitated by addition of aqueous base. The essential feature of the invention is the precipitation of the free amine from its acid salt in the aqueous alkanol medium.

Since the primary effect of the present process is to remove difunctional impurities from p,p'-oxydianiline while the main effect of the extraction process previously mentioned is to remove impurities of lower functionality, although both procedures reduce to some extent the quantities of other impurities present, best results are obtained and it is preferred to operate by using a combination of the two purification process, e.g., forming a water solution of a strong mineral acid salt of the crude oxydianiline, extracting that solution with a suitable water-immiscible solvent, and subjecting the extracted solution to the present precipitation process.

Suitable solvents for use as extractants include aliphatic ketones of 5–8 carbon atoms such as methyl propyl ketone, methyl isobutyl ketone, diethyl ketone, and methyl hexyl ketone, chlorinated lower aliphatic hydrocarbons such as chloroform, methylchloroform, ethylene dichloride, tetrachloroethylene, trichloropropene, and the like, and aromatic hydrocarbons such as benzene, toluene, xylene, ethylbenzene, mesitylene, and similar compounds. Chloroform and methyl isobutyl ketone are particularly preferred extracting solvents.

The extraction is carried out using an acidic aqueous solution of a strong mineral acid salt of p,p'-oxydianiline at a pH of about 2.5–3.5. Such a solution is conveniently obtained by dissolving a mole of oxydianiline in an aqueous solution containing about 1.9 equivalents of a strong mineral acid in such dilution that the final salt solution contains about 10–25% by weight of dissolved solids. The hydrochloride of oxydianiline is the preferred acid salt. The extraction can be run at any temperature where the salt solution remains liquid and homogeneous. It is preferably run at room temperature.

The extracted salt solution may be used directly in the precipitation as described above or it may be treated with activated carbon or treated with a reducing agent to solubilize iron in the product or both of these steps may be performed. These steps may also precede the extraction.

EXAMPLE 1

An alcoholic solution of sodium hydroxide was prepared by dissolving 18.2 g. of 48.7% aqueous NaOH in 86.9 g. of absolute ethanol. A solution of p,p'-oxydianiline dihydrochloride was obtained by dissolving 20 g. of impure p,p'-oxydianiline in 127 g. of 5% aqueous HCl. The oxydianiline had previously been partially purified by extraction of an aqueous solution of its hydrochloride with chloroform. The two solutions were heated to 70° C. and the acid solution was poured into the alcoholic sodium hydroxide with stirring. The resulting slurry was cooled to room temperature and the precipitated p,p'-oxydianiline was separated by filtration. The purified product contained 0.4% of p-(p-aminophenoxy)phenol while the impure starting material contained 1.5% by weight of this impurity.

Example 2 illustrates the failure of precipitation in water alone to remove the difunctional impurity aminophenoxyphenol from p,p'-oxydianiline.

EXAMPLE 2

A solution of crude p,p'-oxydianiline dihydrochloride was prepared by dissolving 51 g. of a crude containing 3.4% of p-(p-aminophenoxy)phenol in 290.9 g. of 4.5% aqueous HCl. Insoluble material was filtered off and the filtrate was treated with activated charcoal and filtered again. The acid solution was then extracted three times with 31 ml. portions of chloroform. While stirring, concentrated ammonium hydroxide solution was added to the extracted solution to a pH of 5.5. The precipitated p,p'-oxydianiline was separated by filtration, washed, and dried. This product contained 2.6% of the aminophenoxyphenol impurity.

EXAMPLES 3–7

A sample of 100 g. of crude p,p'-oxydianiline was stirred with 730 g. of 5% hydrochloric acid and the mixture was adjusted to pH 2.85 by the addition of 10.6 g. of 49% aqueous NaOH. Insoluble solids were removed by filtration and 811 g. of filtered acidic salt solution was obtained.

From this solution, a 540.2 g. portion was taken and extracted three times with 100 ml. portions of chloroform. The extracted solution was filtered and heated briefly to vaporize residual chloroform. Portions of this solution and a portion of the original solution before extraction were then neutralized to precipitate the p,p'-oxydianiline according to different procedures as shown below.

Treatment A

A 133.8 g. portion of the extracted solution was poured into 106.9 g. of 5.5% aqueous NaOH. A thick slurry formed and 60 ml. of water was added to facilitate stirring. The slurry was filtered at room temperature and the solid oxydianiline obtained was washed with water and dried. The product was a light tan solid, weight 14.9 g. It was designated as Product A.

Treatment B

A 133.9 g. portion of the chloroform-extracted solution was mixed with 11.9 g. of 49% aqueous NaOH in 95.2 g. of absolute ethanol. The thin, easily stirred slurry obtained was allowed to cool to room temperature and the precipitated off-white product weighed 13.6 g. and was designated Product B.

Treatment C

Another 133.8 g. portion of the chloroform-extracted solution was stirred into a solution of 12.1 g. of 49% NaOH in 95.6 g. of methanol. The precipitated p,p'-oxydianiline was separated as above to obtain 14.4 g. of light colored Product C.

Treatment D

The remainder of the chloroform-extracted solution was mixed with a solution of 11.4 g. of 49% aqueous NaOH in 86.6 g. of isopropyl alcohol. The resulting thin slurry was allowed to cool to room temperature and the precipitated p,p'-oxydianiline was filtered off, washed, and dried as above to obtain 12.6 g. of light colored Product D.

Treatment E

From the original acid solution before extraction with chloroform, a 135 g. portion was taken and this was mixed with a solution of 12.4 g. of 49% aqueous NaOH in 95 g. of absolute ethanol. The slurry of precipitated p,p'-oxydianiline thereby obtained was treated as before to obtain 14.0 g. of Product E.

The five products above and the original crude were analyzed to determine their purity and the quantities of various impurities present in each. The data obtained are listed in the following table.

| Product | Percent isomer [1] | Percent PA [2] | Percent APP [3] |
|---|---|---|---|
| Crude | 0.16 | 0.62 | 3.43 |
| A | 0.09 | 0 | 3.08 |
| B | 0 | 0 | 0.72 |
| C | 0 | 0 | 1.30 |
| D | 0 | 0 | 0.65 |
| E | 0 | 0.17 | 1.06 |

[1] o,p'-oxydianiline.
[2] p-phenoxyaniline.
[3] p-(p-aminophenoxy)phenol.

Similar results, and in some cases, products of superior purity, are obtained when methyl isobutyl ketone is used in place of chloroform to extract the oxydianiline dihydrochloride solution in the procedure described in Examples 3–7.

EXAMPLES 8–12

An acid solution of the dihydrochloride of a crude p,p'-oxydianiline having a purity similar to that of the oxydianiline used in Examples 3–7 was neutralized in aqueous alcoholic NaOH without previous extraction in a manner similar to Treatment E above but using various concentrations of ethanol in the reaction medium. The analyses of the products obtained are listed below. The percent ethanol is based on the total weight of ethanol and water present in the neutralized slurry.

| Percent ethanol | Percent isimer | Percent PA | Percent APP |
|---|---|---|---|
| 0 | 0.64 | 0.48 | 3.75 |
| 43 | 0.20 | 0.44 | 1.72 |
| 49 | 0.11 | 0.37 | 1.64 |
| 55 | 0.08 | 0.26 | 1.49 |
| 80 | 0.07 | 0.26 | 1.35 |

Higher concentrations of alcohol, as would be expected, give somewhat lower material recoveries as compared to the lower concentrations. By extraction of the acid dihydrochloride solution with chloroform or other suitable solvent as previously defined, the concentrations of all three impurities are further reduced.

Results similar to those shown in the above neutralizations in aqueous alcohol are obtained when the alcohol is n-propyl alcohol or tert-butyl alcohol or when the oxydianiline dihydrochloride is replaced by another strong mineral acid salt, for example, oxydianiline dihydrobromide or oxydianiline bis(hydrogen sulfate).

I claim:
1. A process which comprises precipitating p,p′-oxydianiline from an aqueous lower alkanolic solution of its salt with a strong mineral acid selected from the group consisting of hydrochloric acid, hydrobromic acid, and sulfuric acid, said solution consisting essentially of said salt and about 0.4–6 parts by weight of a water-miscible lower alkanol per part of water, by adding to said solution a base selected from the group consisting of ammonium hydroxide, alkali metal hydroxide, alkali metal carbonate, and alkaline earth metal hydroxide to a final pH above about 5.

2. The process of claim 1 wherein the mineral acid salt is the hydrochloride.

3. The process of claim 2 wherein the base is added to a final pH above 9.

4. The process of claim 3 wherein the base is NaOH.

5. A process which comprises forming an aqueous solution of the salt of p,p′-oxydianiline with an acid selected from the group consisting of hydrochloric acid, hydrobromic acid, and sulfuric acid, said solution having a pH of about 2.5–3.5, extracting said solution by intimately contacting it with a solvent selected from the group consisting of alkanones of 5–8 carbon atoms, aromatic hydrocarbons of the benzene series, and polychlorinated lower aliphatic saturated and monoolefinic hydrocarbons, thereby forming a solvent phase and an extracted aqueous phase, separating said aqueous phase, and adding to said aqueous phase about 0.4–6 parts by weight per part of water contained therein of a water-miscible lower alkanol and a base selected from the group consisting of ammonium hydroxide, alkali metal hydroxide, alkali metal carbonate, and alkaline earth metal hydroxide to a final pH above about 5.

6. A process which comprises forming a solution of p.p′-oxydianiline in aqueous hydrochloric acid, said solution having a pH of about 2.5–3.5, extracting said solution by intimately contacting it with chloroform, thereby forming a chloroform phase and an extracted aqueous phase, separating said aqueous phase, and adding to said aqueous phase about 0.4–6 parts by weight per part of water contained therein of a water-miscible lower alkanol and sodium hydroxide to a final pH of above about 9.

7. The process of claim 6 wherein methyl isobutyl ketone is used in place of chloroform.

References Cited by the Examiner
UNITED STATES PATENTS

| | | | |
|---|---|---|---|
| 1,574,337 | 2/1926 | Bogert | 260—571 |
| 1,890,256 | 12/1932 | Grether | 260—571 |
| 2,996,546 | 8/1961 | Sayigh | 260—571 |
| 3,174,007 | 3/1965 | Berhenke | 260—571 |

CHARLES B. PARKER, *Primary Examiner.*

JOSEPH P. BRUST, *Examiner.*

ROBERT V. HINES, *Assistant Examiner.*